US007725531B1

(12) United States Patent
Sood et al.

(10) Patent No.: US 7,725,531 B1
(45) Date of Patent: May 25, 2010

(54) SINGLE USE SERVER SYSTEM

(75) Inventors: Arun Sood, Clifton, VA (US); Yih Huang, Fairfax, VA (US); David Arsenault, Reston, VA (US)

(73) Assignee: George Mason Intellectual Properties, Inc., Fairfax, VA (US)

(*) Notice: Subject to any disclaimer, the term of this patent is extended or adjusted under 35 U.S.C. 154(b) by 430 days.

(21) Appl. No.: 11/857,055

(22) Filed: Sep. 18, 2007

Related U.S. Application Data

(60) Provisional application No. 60/826,027, filed on Sep. 18, 2006, provisional application No. 60/826,107, filed on Sep. 19, 2006.

(51) Int. Cl.
G06F 15/16 (2006.01)
G06F 15/173 (2006.01)

(52) U.S. Cl. .................. 709/203; 709/224; 709/225; 709/227; 709/229

(58) Field of Classification Search ......... 709/224–225, 709/203, 227, 229
See application file for complete search history.

(56) References Cited

U.S. PATENT DOCUMENTS

| 7,321,926 | B1 * | 1/2008 | Zhang et al. ............... 709/220 |
| 2002/0069369 | A1 * | 6/2002 | Tremain ..................... 713/201 |
| 2003/0154288 | A1 * | 8/2003 | Takamura et al. .......... 709/227 |
| 2006/0143711 | A1 | 6/2006 | Sood |
| 2006/0277321 | A1 | 12/2006 | Sood |

OTHER PUBLICATIONS

Yih Huang and Arun Sood, "Self-Cleansing Systems for Intrusion Containment," Proceedings of Workshop on Self-Healing, Adaptive, and Self-Managed Systems (SHAMAN), New York City, Jun. 2002.
Yih Huang, Arun Sood, and Ravi K. Bhaskar, "Countering Web Defacing Attacks with System Self-Cleansing," Proceedings of 7th Word Multiconference on Systemics, Cybernetics and Informatics, pp. 12-16, Orlando, Florida, Jul. 2003.
Yih Huang, David Arsenault, and Arun Sood, "Securing DNS Services through System Self Cleansing and Hardware Enhancements," Proceeding First International Conference on Availability, Reliability, and Security (AReS 2006), Vienna, Austria, Apr. 2006.
Yih Huang, David Arsenault, and Arun Sood, "Incorruptible System Self Cleansing for Intrusion Tolerance," Proceedings Workshop on Information Assurance 2006, Phoenix, Arizona, Apr. 2006.
Yih Huang, David Arsenault, and Arun Sood, "Closing Cluster Attack Windows through Server Redundancy and Rotations," Proceedings of the Second International Workshop on Cluster Security (Cluster-Sec06), Singapore, May 2006.
Non-published U.S. Appl. No. 10/821,195, filed Apr. 9, 2004, first-named inventor: Sood.

* cited by examiner

*Primary Examiner*—Wing F Chan
*Assistant Examiner*—Benjamin M Thieu
(74) *Attorney, Agent, or Firm*—David G. Grossman (57) ABSTRACT

A system and method for processing a client request using single use virtual servers. The method: receives the client request from a network; passes the client request to a new virtual incoming client request server; passes an application request from the virtual incoming client request server to a new virtual application server; destroys the virtual incoming client request server; passes an application result from the virtual application server to a new virtual outgoing client result server; destroys the new virtual application server; passes the application result from the new virtual outgoing client request server to the network; and destroys the virtual outgoing client request server.

21 Claims, 7 Drawing Sheets

Fig. 3 Request dispatching to virtual servers in SCIT/VS

SINGLE USE SERVER SYSTEM

CROSS-REFERENCE TO RELATED APPLICATIONS

This application claims the benefit of: U.S. Provisional Application No. 60/826,027 filed Sep. 18, 2006, entitled "Single Use Server" and U.S. Provisional Application No. 60/826,107 filed Sep. 19, 2006, entitled "Single Use Server System," which are hereby incorporated by reference in their entirety.

STATEMENT REGARDING FEDERALLY SPONSORED RESEARCH OR DEVELOPMENT

This invention was made with government support under Grant # 60NANB2D0108 awarded by the National Institute of Standards and Technology. The government has certain rights in the invention.

BACKGROUND

The difficulty in securing computer systems stems in large part from the increasing complexity of the modern information services and the advancing sophistication, pace, and variety of attack techniques. The problem is further exacerbated by the continued discovery of software bugs/vulnerabilities and the collective development of and experiments with new attacks over the Internet. These trends warrant a new thinking in computer security: there will always be attacks that are sophisticated and stealthy enough to penetrate even the best security measures and evade the most advanced intrusion detection systems. It follows that a critical information system should support intrusion tolerance to fend off or limit the damage caused by unknown and/or undetected attacks.

While intrusion detection and prevention has been the subject of extensive research and commercialization, intrusion tolerance has received less attention. In previous research, a novel approach to the intrusion tolerance problem called Self-Cleansing Intrusion Tolerance (SCIT) was developed. The underlying assumption of SCIT is that a server that has been performing services online, and as a result exposed to attacks, may be assumed compromised. Consequently, an online server is periodically cleansed to restore it to a known clean state, regardless of whether intrusion is detected or not. While this paranoid attitude may be overkill for an average information service, it is perfectly appropriate for critical infrastructure services or those whose breaches compromise national security or result in high pecuniary losses.

Applications of this technique were investigated for applications to server rotation and cleansing to firewalls, web servers, and DNS servers. Additionally, hardware solutions were devised to guarantee the incorruptibility of SCIT operations and a SCIT control algorithm was developed for use in SCIT server clusters. An important strength of SCIT is to minimize the window of exposure during which a server stays online and remains vulnerable to attack. The previous work shows that SCIT limits the exposure window to typically less than 10 minutes. What is needed is an enhanced SCIT system that may decrease exposure windows further without using customized and dedicated hardware.

DETAILED DESCRIPTION OF EMBODIMENTS

Embodiments of the present invention include virtual single-use servers that may be configured to be used online only once and subsequently disposed and destroyed. In the meantime, the online functions of a disposed server may be taken over by a new server constructed and configured from scratch, thus guaranteeing a known clean state of the new server. Additionally, some embodiments should enable exposure times that are measured in fraction of seconds rather than in minutes. Such short windows should severely limit an attacker's opportunity to inflict damage, such as stealing and/or tampering with sensitive information, poking system configurations, using the compromised server as a jump pad to other servers, and so on.

Another characteristic of some embodiments of the new single use server is randomness and diversity. Each virtual server in a virtual single use SCIT server (SCIT/VS) may have characteristics and environments different from their peer servers in the past, at the present, or in the future, forcing the enemy to re-learn the system again and again. Preferably, customer service will not be interrupted, and all servers providing the same service behave in the same way at the application layer, although the servers may employ different internal configurations. Essentially, embodiments of the present invention allow for the manufacturing and individualizing new virtual SCIT/VS servers on the fly.

The SCIT/VS system should be greater than the sum of its individual components. Short life spans of (virtual) servers and randomized configuration of each virtual server will force attackers to learn/probe target servers individually, while knowledge thus learned will have little use against other peer servers at the moment or those created in the future. This should frustrate even the most determined attackers who intend to compromise and stay in a system for longer term gains. Furthermore, the differences among servers will almost certainly neutralize automated, scripted attacks, which by their nature make assumptions about the target systems. Where randomness and unpredictability do not thwart attack, frequent rotation will limit damage to a single use.

Virtualization is a key to achieving these demanding goals in many embodiments. Server virtualization enables a single server box to support multiple, isolated virtual servers, and is typically used for server consolidations, centralized management and administration, and improved utilization of hardware resources. Virtual servers may be created and destroyed on the fly, do not use CPU cycles when they are idle, and are relatively easy to manage and configure by the underlying host operating system. The increasing importance of virtualization is testified by the popularity of various virtual machine monitor software solutions, such as VMware (available from VMware, Inc. of Palo Alto, Calif.) and Xen (available from XenSource Inc. of Palo Alto, Calif.), and hardware (chip level) support from major processor vendors, such as Sun Microsystems, Inc. (of Santa Clara, Calif.) Hypervisor, Intel corporations (of Santa Clara, Calif.) VT, and Advanced Micro Devices, Inc. (of Sunnyvale, Calif.) Pacifica technologies. Embodiments couple the concept of SCIT with virtual servers (SCIT/VS), introduce diversity and uncertainty for attackers, and to explore the performance, security, and cost trade-offs that result.

The concept of SCIT/VS (or SCIT in general) may not be compatible with all types of computing systems. However, SCIT/VS should be applicable to services with the following three properties. First, services that are transaction-oriented in nature. Transaction-oriented services including HTTP, DNS, many directory services, authentication servers, and NFS, enable the requests from the same client to be handled by different servers, have minimal penalty for aborted/incomplete transactions, and are natural matches with the operations of SCIT. Second, services that involve short sessions. Many back-end office and transaction-oriented services and some database applications satisfy this requirement. For these services, SCIT may need to support a grace period, Tgp, so that an online server is informed of its "retirement" Tgp seconds in advance to finish its services to existing clients/requests. Third, single use servers may need to support long transactions. As the exposure window reduces, single use (virtual) servers should be more affordable. One way form a virtual Server to support a long transaction is to after accepting a long duration request, disconnect from the internet, process the request, reconnect to the internet, and deliver the results and then destroying itself. For example, these actions should enable single use servers to handle long transactions such as database queries.

SCIT/VS addresses should reduce the probability of a successful breach by (1) the use of server redundancy, including virtual servers to yield extremely short exposure times, (2) virtualization technology and methodologies for fast generation of virtual servers, and (3) the use of operating system diversity and randomized software configurations to make the memory image unpredictable.

SCIT/VS, in essence, may use two methods to increase server security and survivability. First, it may reduce server exposure time and life spans to make it difficult for hackers to exploit vulnerabilities. To achieve this objective, rapid production of virtual servers may be required. In the limit, each of server may be used to handle only a single transaction/request then subsequently be destroyed, effectively reducing the exposure window to the duration of that single transaction. Even if the server is breached, the corruption may be automatically removed in the next rotation cycle. Second, SCIT/VS may reduce the probability of successful attacks by introducing diversity among virtual servers. Each VS could be different from others in its operating system, application code, configuration, and memory image.

Building different embodiments of a SCIT/VS system may depend to a large degree on the feature set and efficiency of the underlying virtualization technology, which itself is still rapidly evolving and improving. Therefore, this discussion will start with the aspects of virtualization that may be important to SCIT/VS.

SCIT/VS and State-of-Art Virtualization Technologies. Owing to its radical and pioneering nature, SCIT/VS may push virtualization technology to extremes. In fact, it appears that four of the major virtualization technologies show all of the features that may be desirable for a SCIT/VS system (the four technologies are Solaris Containers, VMware, Xen, and User Mode Linux). As a result, some embodiments may be need to address missing features by modifying existing technologies, by finding workarounds that give acceptable compromises in performance or security liability, or a combination of both. On a positive note, the missing feature should not be fundamentally difficult implement. The lack of vendor interest in supporting these features reflects more on the common uses of virtualization at the time of this disclosure, than the technical feasibility or challenges. In the following, important features of virtualization technologies that have may have an impact on SCIT/VS will be discussed. In this discussion, the terms virtual machine (VM) and virtual server are used interchangeably.

VM file systems. The virtualization technologies identified earlier support the use of either real disks/partitions or virtual disks by VMs to build file systems. The term virtual disk refers to a regular file as seen and manipulated by the underlying host or the VM monitor but used as a raw storage device by the guest OS running inside the VM. Because some embodiments may use large numbers of VMs, it may be advantageous to only use virtual disks with SCIT/VS virtual servers.

VM forking. In Unix/Linux systems, forking an application process to create an identical child image may be achieved without duplication of the parent's memory image. Rather, both the parent and child processes initially share the same memory images. The duplication of a particular memory page may occur only when one of the processes performs writes on that page. This technology, called copy on write or CoW, may greatly reduce the overhead associated with using large numbers of processes. Ideally, one could use a similar mechanism to fork VMs with similarly low overhead. That is, immediately after forking, the parent and child VMs may use the same memory image and file systems, while CoW principles are applied to both memory images and file systems when the two VMs go their separate ways. Such a fork likely will take from tens to hundreds of milliseconds, allowing new VMs to be created at a fast rate. Presently, none of the virtualization technologies mentioned earlier appear to support this feature. Among them, only the Xen project puts "live fork" on its roadmap. Lack of VM forking support may require solutions and/or workarounds that will be discussed later.

VM cloning. Cloning refers to the process of duplicating every aspect of a "cold" VM (it is not running during the cloning process). To be used for online services, both the parent and its clones may need to first be "cold booted" to initiate the guest OS and launch the application processes. Currently, cold booting may take from 30 seconds to more than one minute, depending on the guest OS in question and the underlying hardware. This process may result in significantly slower rates of creating new virtual servers, forcing them to be used for longer periods of time with higher risks of being compromised. Two types of cloning are available. (1) A full clone will have a separate copy of every aspect of the mother VM. Most importantly, the entire file system of the mother VM may need to be duplicated, an activity that could involve gigabytes of information. (2) A linked clone may initially link the file system of the child to that of the parent, and CoW used to maintain the concept of two separate and different file systems. Linked cloning is probably the most efficient method of creating new VMs available now. Even so, it may be inefficient, if not too slow, to produce SCIT/VS virtual servers at sufficiently fast rates if every clone still has to be cold booted before going online.

With SCIT/VS, fast virtual server production should allow individual virtual servers to be disposed of quickly, shortening server exposure times and increasing system security. In the ideal case, VM forking, when available, may be used to build our SCIT/VS embodiments. Solutions for when VM forking is not available will now be disclosed.

Present virtualization technologies provide the feature of dumping to a file the memory state of a "live" VM. The VM can later resume its operation by restoring the memory state from the file. This feature is effectively the "hibernation and wake-up" function available on laptop computers. Our plan is to apply the technique of linked cloning to the memory state file, waking up multiple copies from one hibernating VM. Because wake-up from hibernation is much faster than cold booting, this technique is expected to be far more efficient. Moreover, since the wake-up task will be continuously repeated to produce new VMs, the memory state file involved will almost certainly be cached in memory by the underlying host operating system or VM monitor. This caching should further speed up the wake-up process, resulting in high rates of producing new "live" VMs. VMware is our initial choice for virtualization because of its support for hibernation and wakeup via linked cloning.

VM forking may be a preferable mechanism for producing SCIT/VS virtual servers. However, alternate mechanisms may be built using the above technique. Owing to the ongoing and rapid advances in virtualization technologies, one may treat their feature sets and performance parameters as constantly changing factors; otherwise an "optimal" SCIT/VS design may quickly become obsolete. Simulation efforts may be used to deal with the challenges of adapting SCIT/VS to ever evolving virtualization technologies.

Figure 2:
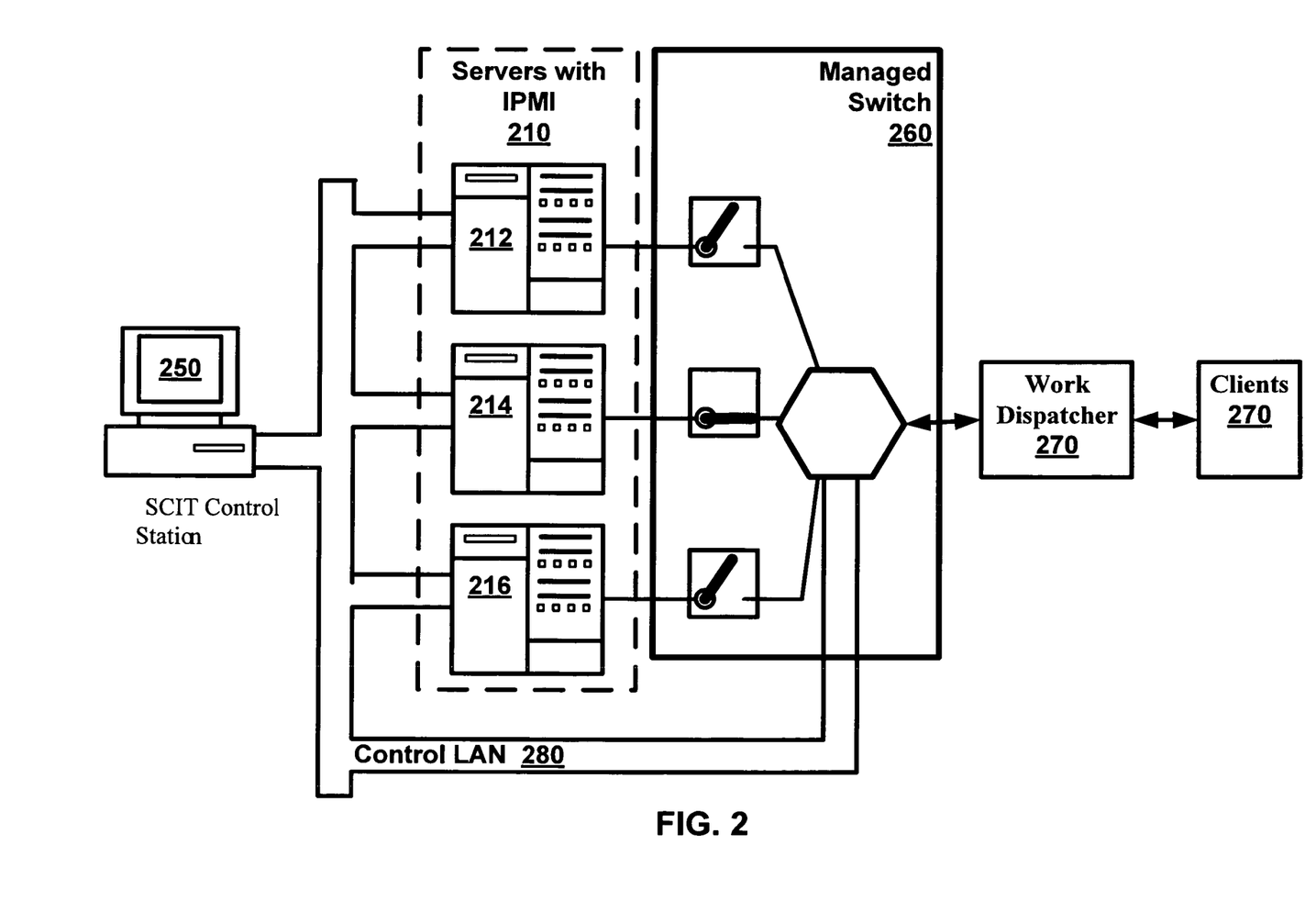
FIG. 2 is a block diagram of a hardware configuration for an aspect of an embodiment of the present invention.
Figure 3:
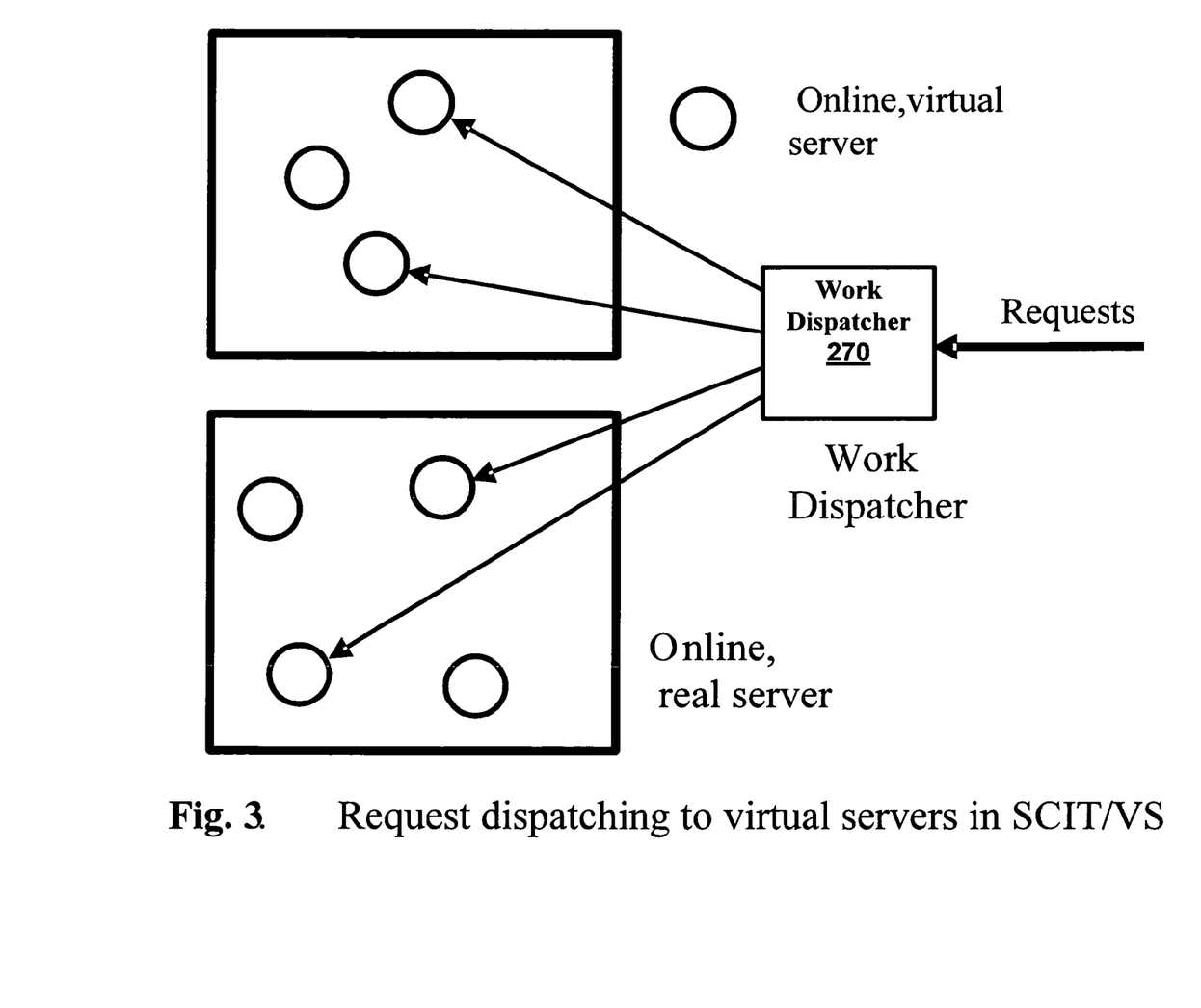
FIG. 3 is a block diagram of a work dispatcher as per an aspect of an embodiment of the present invention.

SCIT/VS Prototype. A SCIT/VS system may be built and used as a platform for further develop embodiments that integrate SCIT and server virtualization technology. A block diagram of such an embodiment is shown in FIG. 2. As shown, this embodiment includes a small number of middle range server boxes 210 (three servers 212, 214 and 216 are shown in the figure) and may employ a virtual machine monitor such as VMware to run multiple virtual servers in online real servers. When a client request arrives, the Work Dispatcher 270 chooses a virtual server for the client, as illustrated in FIG. 3.

Figure 1:
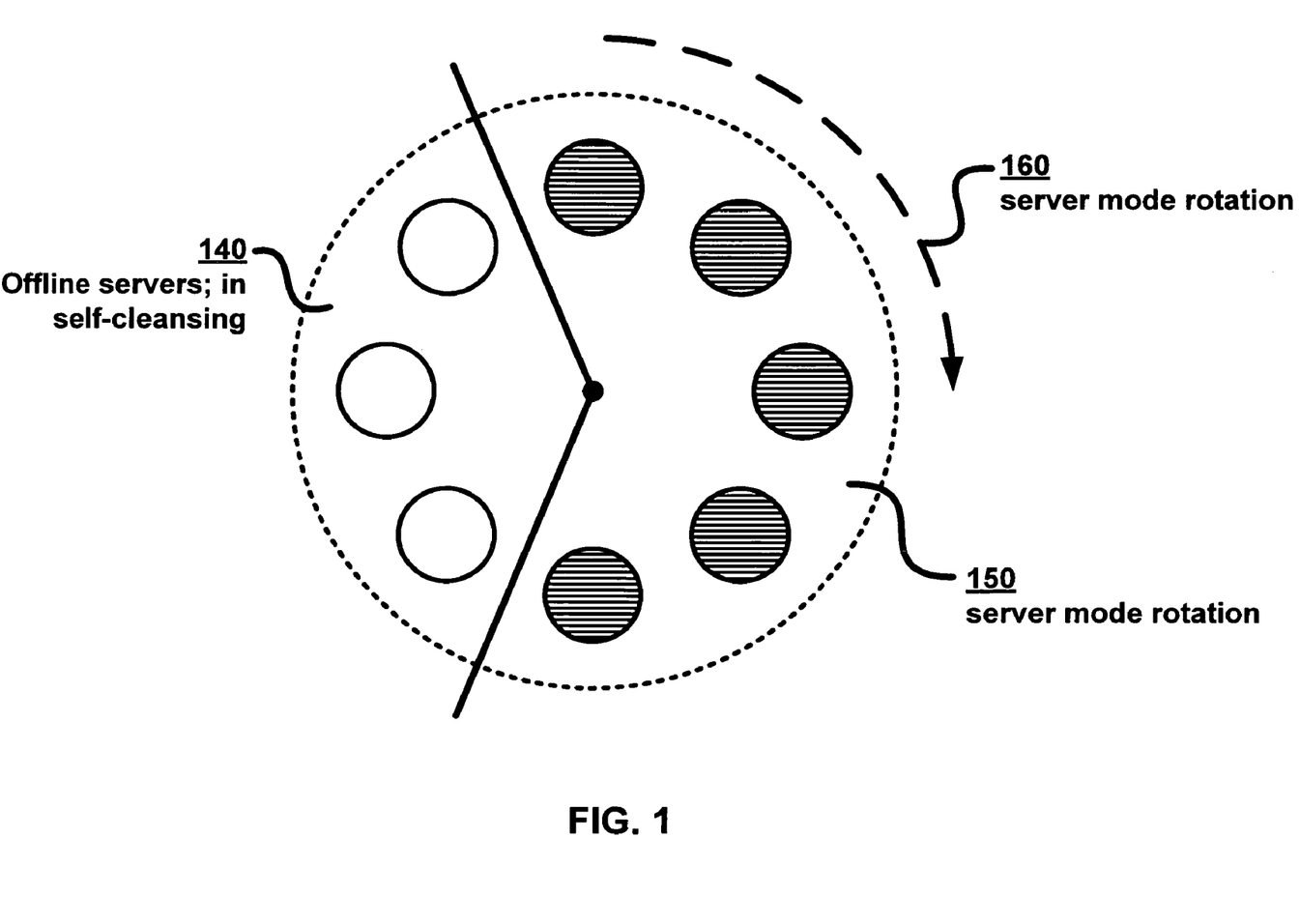
FIG. 1 is an illustration of servers going through a self-cleansing rotation.

Each server machine 212, 214 and 216 in FIG. 2 may support an IPMI (Intelligent Platform Management Interface) used by the SCIT Control Station 250 for hardware rotation of physical server machines. A managed Ethernet switch 260 may be used to connect servers 210 to the clients 270 from a network such as the Internet. This switch 260 may support a special management port through which regular data ports can be enabled or disabled individually. This management capacity may be used to dynamically connect online server(s) 210 to clients 270 and disconnect cleansing/offline servers, ensuring that clean servers are shielded from attacks. As illustrated in FIG. 2, only the middle server 214 is presently online and therefore may be reached from the public Internet, corresponding to one of the online servers 150 circle in FIG. 1. The top and bottom servers in FIG. 2 are presently disconnected from the Internet and correspond to two of the offline severs 140 in FIG. 1.

Earlier implementations of hardware based SCIT systems have shown the incorruptibility of hardware-level server rotation and cleansing (in short, it is because of the disconnection of SCIT control station and clean servers from the public Internet and the rest of the intranet). Previous experiences and prototypes have shown that hardware-level activities occur in the order of minutes. In SCIT/VS, the integration of virtual server rotation with hardware-level SCIT rotation effectively multiply the number of servers available and to vastly increases server rotation frequency, thus minimizing server exposure time. This type of embodiment may only bounded by the number of available server machines, CPU bandwidth, memory, and disk.

The above described SCIT/VS embodiments may be created with SCIT clusters of Web and DNS servers.

Virtual Servers in SCIT/VS. Unique aspects and innovative ways of using of SCIT/VS virtual servers will now be disclosed. Note that these embodiments are not using the virtual servers for the traditional purposes such as server consolidation.

Single Use Servers and Very High-Speed Rotations. One goal of some embodiments is to push the rates of server rotations as close to the limit as is reasonably possible. In this perspective, the ultimate benchmark may be single-transaction-only servers, that is, an online server that handles only one request/transaction and is immediately destroyed subsequently. It is not clear whether the said extreme form of rotations is achievable. Even if it is, it may be achieved only with a relatively small number of services. Good potential candidates of these services may be transaction-oriented (for instance, one exchange of request and reply). However, other services may be used. Single use servers should result in exposure times in the range of tens to hundreds of milliseconds. If single-user servers should also render many types of server compromises irrelevant. The installation of root kits or Trojan horse programs, for example, should cause no harm for they will never have the opportunity to be invoked.

Embodiments may use a weaker form of the single use policy allows a virtual server to process a small number of requests/transactions before it is destroyed. The key factor may be the rate at which the system can manufacture new virtual servers and cleanse existing ones. The faster servers can be disposed, the faster new servers can be created. We notice that fast production of virtual servers demands processing power. Spare power may be used in the in the clean, standby servers (the real ones) to create new virtual servers in the background. Performance and simulation studies may be performed to determine which form of the single/multiple use policy is feasible with specific embodiments.

Diversity, Randomness and Unpredictability. Constants in a SCIT/VS cluster may be the services that the cluster is configured to provide. Other factors such as server online durations, software implementations, underlying operating systems, and processor architectures may be considered as variables. Variable factors could change from one online server to its successors. The use of these variable factors may be used to introduce unpredictability in SCIT/VS operations, while ensuring the predictability of the service behaviors. More specifically, varying the following aspects from one virtual server to another in order to inject randomness in to the system should create an unpredictable environment for would be attackers.

Life span of VS. Each individual VS may be configured to process a random number of requests. Further, VS could be disconnected from the internet multiple times during its life span. As such, the attacker should have a low probability of reaching a previously attacked (and thus potentially already corrupt) VS.

Process memory layouts. A majority of software bugs/vulnerabilities relate to buffer/stack overflows. Many systems use special compilers to produce extra codes that check the boundaries/safety of memory accesses at run time. Typically, these extra checking/recovery codes slow down the server significantly, sometimes degrading the performance by a factor of 2 or more. However, many exploits of buffer overflows may be thwarted if the compiler simply allocates more space then the programmer asks for. For instance, a SCIT/VS compiler may allocate extra space with randomized sizes for buffers/arrays. For instance a C declaration "char buf[100];" may be allocated 7 bytes before buf[0] and 10 bytes after buf[99]). Similar effects may be achieved with dynamic memory allocation mechanisms, such as the "new" operator in C++. This simple strategy may be used to minimize (or hopefully eliminate) runtime overheads, at the price of slightly bigger memory usage.

Software (guest operating systems and service applications). Another way to increase attack difficulties is to provide identical services with different software, either different guest operating systems, server packages, or both. Some forms of software diversity may be more difficult to achieve than others. For example, to configure a Linux/Apache web server to behave in exactly the same way as a Windows/IIS server may be a formidable challenge. On the other hand, to run the same Apache setup on a Linux system and a BSD system should be relatively straightforward. Diversity may also lead to increased procurement, support and maintenance costs that may need to be factored this into performance measures.

System configurations. Many cyber attacks make assumptions about the configurations of a victim. A simple way to thwart such attacks is to use atypical system configurations. For instance, rather than using /usr/bin as the default path to application binaries, as the case of most Unix/Linux system, a virtual server in SCIT/VS could be configured to use a different randomly generated path (for example, /usr/0408acPv). This technique should prevent most of the Trojan horse programs and root kits to be installed in the default paths, and consequently deter their invocation.

It is emphasized that each individual concept above may not be the most effective system defense. Their combined effectiveness however should be much greater. For instance, some information leakage bugs allow an external attacker to obtain environment variables of a system (including the path variable $PATH). Therefore, an idiosyncratic application path is ineffective against follow-up attacks after the path has been learned by the attacker. In SCIT/VS, however, the use of large numbers of short-lived virtual servers renders it very unlikely for the attacker to hit the same VS in follow-up attacks. Even if, by sheer luck, a follow-up attack is successful, its impact should be limited by the short life of the victim virtual server. Similar observations apply to software varieties and randomized memory layouts.

As just disclosed, the VS production process enables random selection of new configurations. This is not possible in long-lived servers of today, and exploiting this property of virtualization technology should increase resistance to attacks.

Figure 4:
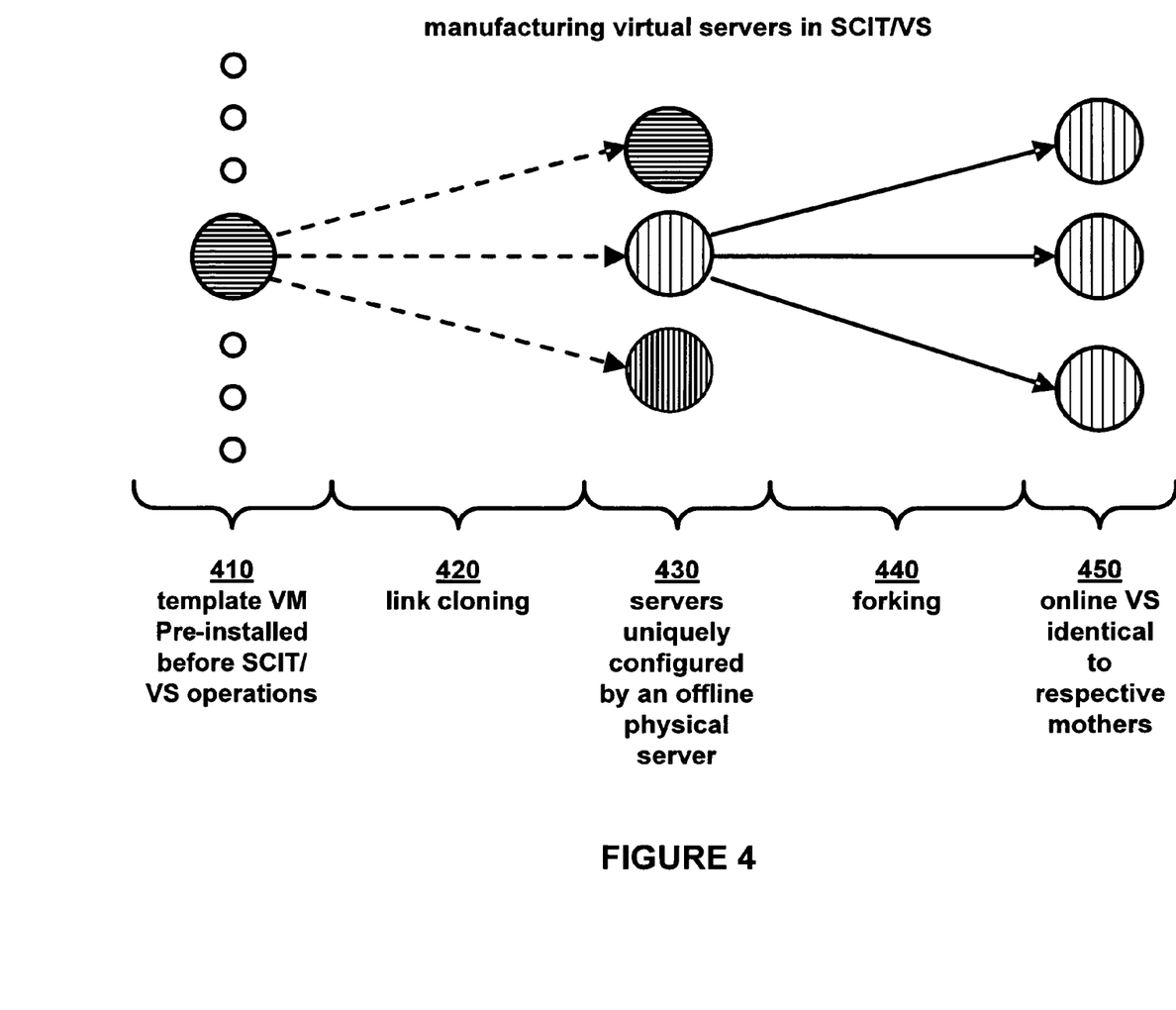
FIG. 4 is a diagram illustrating the creation of virtual servers as per an aspect of an embodiment of the present invention.

Manufacturing Virtual Servers. As illustrated in FIG. 4, virtual servers in SCIT/VS may be manufactured in three actions. First, a number of template VMs may be created and pre-installed at 410. Just like any real server, a virtual machine must undergo an installation process to install and configure its operating system and applications. This is a real operating system installation procedure and just as time consuming as OS installations on real machines. VM OS installations may be performed before a SCIT/VS system goes into operation. Before a SCIT/VS cluster goes online, it may already be equipped with a small number of fully installed VMs, each using a unique OS and application combination (Linux and Apache, BSD and Apache, Windows and IIS etc.). Rather than being used online directly, these pre-configured installations may be used instead as templates to speed up the process of creating VSs with unique characteristics in the next action.

Second, a unique, diverse "mother" VSs may be derived from corresponding template VMs by dynamically configuring each mother VS environments to create characteristics different from its template VM (different default paths, process memory layouts, etc.). The template VM's may be link cloned at 420 and then uniquely configured at 430. This action may be performed by a clean, offline real server in SCIT/VS.

Third, mother virtual servers may be used to fork child virtual servers that actually service clients at 440. Alternatively, virtual servers may be awakened from hibernation if VM forking is not available. Every child VS thus created should be identical to its mother VS as illustrated at 450. As a result, number of varieties and degree of randomness in a SCIT/VS cluster may be determined by the number of mother virtual servers in the system, as well as the degrees of differences among mother VS.

As seen above, a degree of variety may be built into the template VMs before a SCIT/VS system goes into operation, owing to their use of different guest operating systems and application codes. Further varieties may be created by clean, offline servers in the form of mother virtual servers. Such varieties may be created by one or a combination of the following techniques discussed earlier: (1) recompile the application to produce binaries with randomness in its executables (extra space allocated to buffers, for instance); (2) reconfigure the guest OS, for instance, to change default executable and library paths; and (3) recompile the kernel code of the guest OS for the same reasons of recompiling application codes.

The randomization techniques described above may vary in their effectiveness and costs. Compared to recompiling the application, for instance, using unique default paths has the advantage in efficiency: such a reconfiguration typically involves rewriting a few lines of system configuration files. However, some information leakage bugs may reveal system defaults, even uncommonly configured ones. On the other hand, it may be much more costly to recompile (part of) application code but there is a significant deterrence to an attacker. For example, for an attacker to determine the exact size of extra space allocated to a buffer by a recompilation may require trial and error, which may require more time, which in turn may be deterred by server rotation and randomization approaches. Therefore, there may be tradeoffs (effectiveness versus cost in terms of performance penalty) among virtual server randomization techniques.

Comparison of the overhead of SCIT/VS with other fault-resilient technologies. It is probably inevitable that increased security is gained at the price of increased overhead. For instance, many compiler-based security approaches add codes that check the safety of memory accesses at run time. Such runtime overhead may slow servers down significantly (sometimes more than a factor of 2). With SCIT/VS, however, the overhead cost of creating varieties and randomness may be absorbed offline. This observation leads to intriguing possibilities. For instance, during light workload periods, a SCIT/VS system could use spare hardware servers in the offline mode to produce mother virtual servers and reserve them in back-end storage for later retrieval. During peak workload periods, servers may be shifted online and draw upon a large pool of pre-built mother virtual servers, maintaining high levels of randomness and security without the ensuing overheads. The effective "saving" security-imposed overhead costs may be by using spare processing capacity to create mother VSs for use in rainy days.

Effectiveness against Attacks. SCIT/VS should contain remote buffer overflow attacks, denial of service attacks and automated, scripted attacks effectively. Remote buffer overflow attacks may be contained by allocating random amounts of extra space to buffers. This should help SCIT/VS render it unlikely that buffer overflow attacks will succeed, because doing so requires knowing the exact distance from the target buffer to some other key data structures (most frequently the return address pointer in the runtime stack). Less harmful effects of buffer overflow attacks, such as erroneous application behaviors or application crashes should be contained by the short life span of the victim virtual server.

Denial of service may be contained by SCIT/VS because of the loss or reduction of service availability of the victim servers (for instance, by causing the application processes to crash). The reduction of overall service availability however may be contained by the large pool of virtual servers in SCIT/VS and the short life spans of individual virtual servers. Note that this category may not include flooding DoS which is discussed separately.

Automated scripted attacks are highly unlikely to be successful with embodiments of SCIT/VS due to the large varieties among virtual servers and the preprogrammed assumptions of the attack scripts. This category includes the notorious network worm attacks (e.g., the Code Red worm).

Embodiments of SCIT/VS should be partially effective against information leakage, illegal command executions, Trojan horses and root kits. Embodiments of SCIT/VS may not have direct mechanisms to prevent information leakage bugs from being exploited. However, the large diversities and short life spans of virtual servers will almost certainly render leaked information useless. Only in a rare case will the follow-up attack hit the same virtual server or another one with identical configurations. Even in such cases, the short life of the victim server should limit the adversary impact to a short period of time.

Illegal command executions should be considered configuration errors. For example, the administrator should bar the execution of shell scripts embedded in client requests. However, often administrators do not do this. SCIT/VS may not prevent configuration errors made by administrators. On the other hand, randomness in configurations should render the scripts harmless. Even if the attack succeeds, embodiments of SCIT/VS should limit its impacts to the end of the victim VS's life, or to the next cleansing cycle.

Trojan horses and root kits may be considered malware. On servers, malware may slip into the system through either buffer overflows or illegal command executions. Embodiments of SCIT/VS should be effective against the former but may not prevent the latter. It is therefore possible to install malware on SCIT/VS virtual servers. However, with randomized configurations, malware programs are unlikely to be invoked because they are not installed in the idiosyncratic application paths of the victim server. Moreover, they should automatically be removed when the victim virtual server is destroyed.

Embodiments of SCIT/VS where the goal of single-use servers is achieved should be effective (not just partially) against the above attacks. In such circumstances, successful breaches on any virtual server should have no impact on subsequent operations of the SCIT/VS system.

Extensions of SCIT/VS. There is a potential for extending SCIT/VS. On the client side, the use of virtualization technology may result in launching each application, and each instance of the application in an independent VM, thus reducing application interdependence. This may be implemented using modern dual core processors for clients. With isolation of application data and application program code, application programs cleansing and regeneration can use the SCIT/VS approach.

Hash techniques may be used for breach detection. In the case of a breach, the VS may go through an audit process between the disconnection of the VS from the internet and destruction of the VS. This audit step should detect malicious changes to the program memory or the application specific disk space. For example, existing hash techniques should lead to fast detection of successful malicious changes. By comparing successive audit cycles, it may be possible to define the type of breach and enable the administrator to take countermeasures.

The SCIT concept based on constantly rotating online and offline servers. The concept is shown to be compatible with many critical, infrastructure information services, especially those that deploy (high levels of) hardware redundancy to ensure service availability. SCIT may be used to enable firewalls, web servers, and DNS servers. Increasing the number of servers reduces the server exposure times and improves security. It is noted that increasing the number of virtual servers is far cheaper than buying real servers. Using virtualization technology should reduce the cost of SCIT systems. Virtual servers are excellent candidates for SCIT rotation and cleansing, indeed superior to real servers in many aspects; hence this proposal.

The concept of intrusion tolerance assumes that undetected intrusions are inevitable and must be treated as an inherent problem of clusters, which considers software and human errors as the norm and handles them as part of normal operations. Simple forms of server rotations have previously been employed in high-availability systems, where backup servers rotate online to ensure uninterrupted service in face of primary server failures. SCIT systems share many design challenges with high-availability systems, such as the seamless server transitions and sharing of server identities (IP and/or hardware addresses). Examples of high-availability systems include DNS servers, NFS servers, authentication services, firewalls, IPsec gateways, and virtual private network gateways. However, it needs to be noted that in many server clusters the term "server rotation" often refers to "rotating online servers in servicing arriving clients," typically for the purpose of workload sharing. Such rotations are not related to SCIT. SCIT server rotation and self-cleansing processes are a special form of software rejuvenation for use by server clusters.

Figure 5:
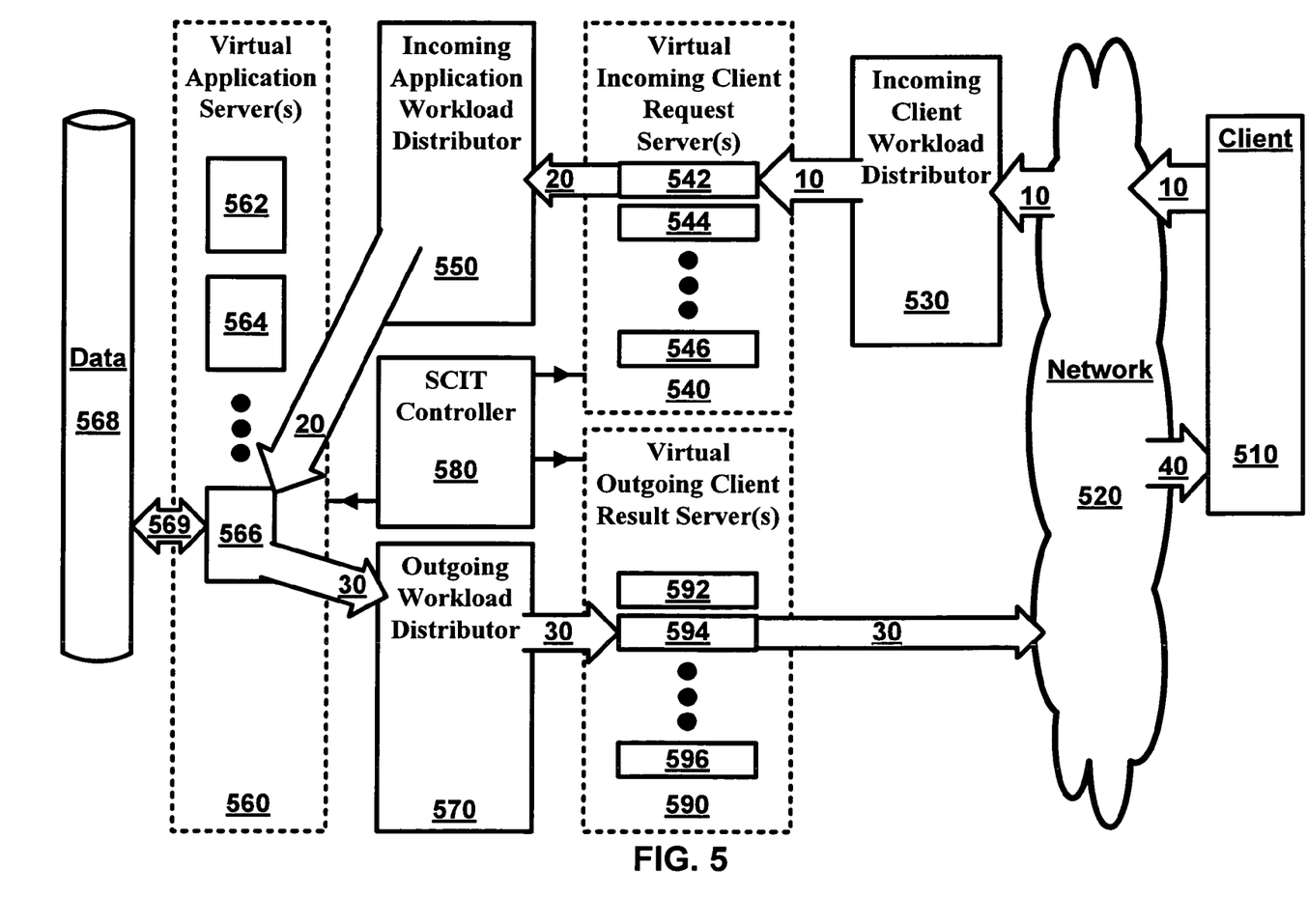
FIG. 5 is a block diagram of a single use server as per an aspect of an embodiment of the present invention.

Several embodiment of SCIT will now be disclosed. FIG. 5 is a block diagram of a single use server system 100 as per an aspect of an embodiment of the present invention. A client request 10 may be received by an incoming client workload distributor 530 through a connection to a network 520. Workload distributor 530 may use proprietary software or off the shelf load balancing software such as: Traffic Management Operating System (TMOS) available by F5 Networks, Inc. of Seattle Wash.; and ZXTM Zeus Extensible Traffic Manager available from Zeus Technology, Ltd. of Cambridge, UK. A load balancer may be used to increase the capacity of a server farm beyond that of a single server. It may also allow the service to continue even in the face of server down time due to server failure or server maintenance. The workload distributor 530 may consists of a virtual server which, in turn, consists of an IP address and port for receiving client request 10. This virtual server may be bound to a particular IP address and port.

The incoming client workload distributor 530 may be configured to pass the client request 10 from the network 520 to one of the new local virtual servers 542, 544 ... 546 hosted on virtual incoming client request server module 540. Each of these new local virtual servers 542, 544, ... 546 should have a unique local address. The local virtual server 542 forwards the message 20 to incoming application workload distributor 550, who in turn passes message 20 to virtual application server 566. Virtual application server 566 is one of a multitude of new virtual application servers 562, 564, ... 566. These virtual servers may be hosted by of one or virtual application server modules 560. After message 20 is passed from virtual server 542, virtual server 542 may be destroyed, thus minimizing any danger to the system.

The virtual application server 566 may perform an application such as present a web page or retrieve data from a database in response to message 20. Some of the applications may need access to data (e.g. database accesses). As shown, the virtual application server 566 may communicate data 569 to and from persistent storage device 568. Using persistent storage may allow applications to save data and retrieve data over long periods of time. Virtual application server 566 may take a relatively long period of time to execute, especially if it needs to perform a lengthy operation. However, in some cases the operation may be shortened by using multiple operations to access persistent data 568. Each of the shortened operations could be performed by applications running on different virtual application servers 562, 564 ... 566. The applications may use the persistent data storage 568 to pass state variables between the discrete virtual applications. After each virtual application server has run its application to a logical ending point, the virtual application server may be destroyed, again minimizing any danger to the system.

Output result messages 30 from the virtual application server 566 may be passed to an outgoing workload distributor 570 who in turn may pass it to one of a multitude of new virtual outgoing client result servers 592, 594 ... 596 residing on virtual outgoing client result server module 590. In the illustrated case, the outgoing message 30 (which should contain client information) is passed to new virtual outgoing client result server 594, who in turn may pass the message back to the client 510 through network 520. Virtual outgoing client result server 594 maybe destroyed, again minimizing any danger to the system, after it has passed the result message 30 to client 510 through the network 520.

Throughout these actions, the virtual incoming client request server module 540, virtual application server module 560, and virtual outgoing client result server 590 may be controlled by a SCIT controller module 580. This SCIT controller module 580 may control the creation, status and destruction of the virtual servers in each of these modules as described earlier.

It is envisioned that embodiments may be built many different ways. For instance, the virtual server modules may exist on physically separate modules or together on one physical module. Each of the components may be combined or separate, either physically or logically. In this context, the term module means a self-contained component of a system, capable of interfacing with other components. In particular, it is anticipated that embodiments of the present invention may be constructed using software, hardware and network based modules. For example, the virtual server modules may pass messages to other virtual server modules. Similarly, SCIT controller module may control the creation, management and destruction of virtual servers in different virtual server modules. The SCIT control signals may include unidirectional outgoing signal(s), feedback signal(s), protocol signal(s) or the like. Additionally, it is reasonable that modules identified in this disclosure may be created using other modules. For example, as shown in FIG. 5, SCIT controller module may actually contain separate SCIT control modules as will be illustrated in FIG. 6. Module(s) may actually be a self contained program(s) or series of programs that may reside on one or more computers. Computers in this disclosure may be a general purpose computer, an application specific computer, an application appliance, a server or the like. When the modules reside on multiple separate computers, those computers may be part of a bank of related computers or be a collection of independent computers. It is even possible that some modules may reside on multiple computers that are configured to communicate through a network. The modules may be stored on a tangible computer readable medium as a series of processor executable instructions that when executed by one or more processors, performs their useful function. Similarly, a module may be constructed using hardware such as an ASIC, an FPGA, or discrete hardware. This may be useful in some instances to provide fast processing.

Figure 6:
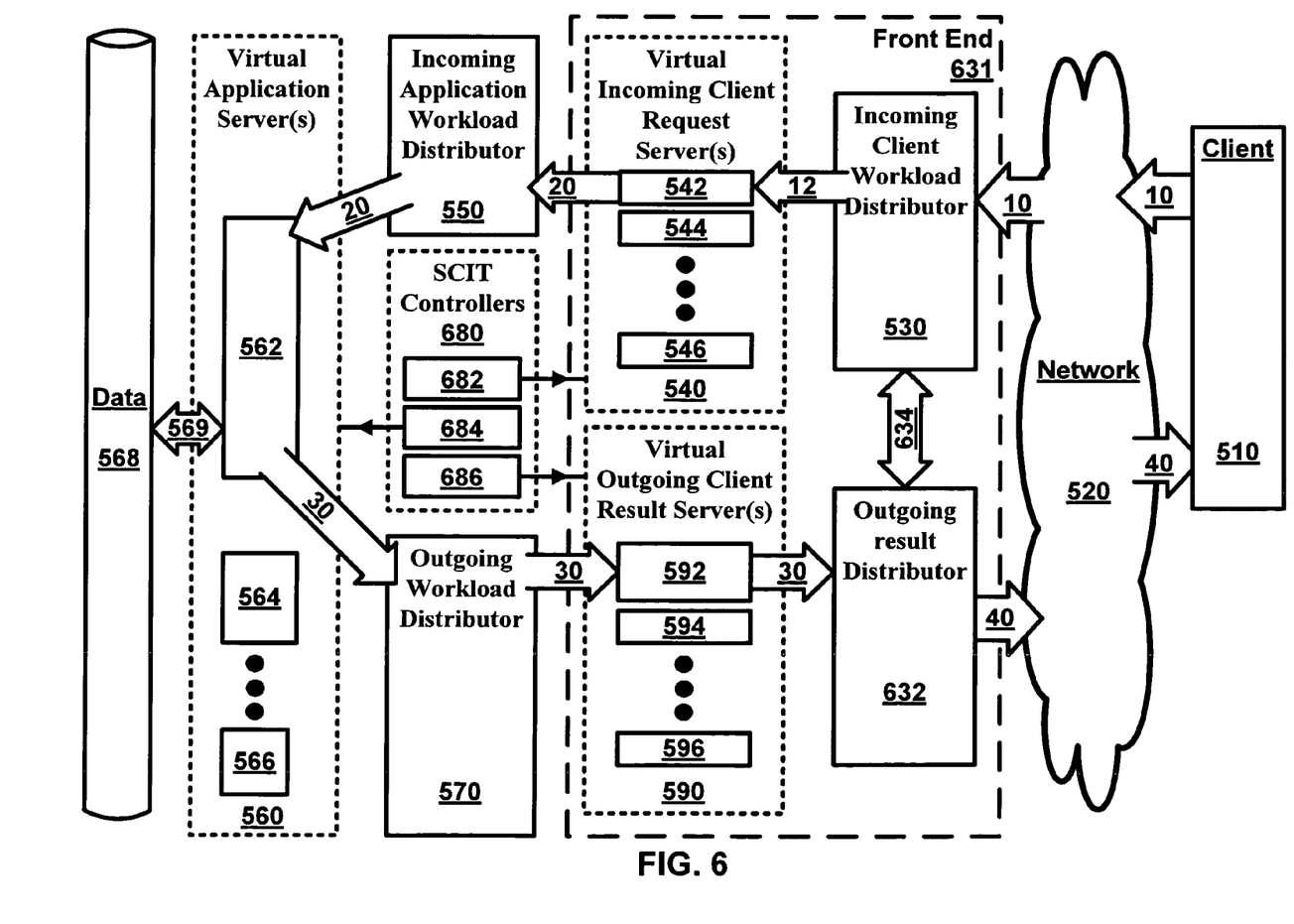
FIG. 6 is a block diagram of a single use server as per an aspect of an alternative embodiment of the present invention.

FIG. 6 is a block diagram of an alternative embodiment of a single use server system. Many of the differences with this embodiment and that of FIG. 5 is shown to emphasize how variations may be created. For example, FIG. 6 shows a new outgoing result distributor module 632 with a data connection 634 to incoming client workload distributor 530. This configuration may allow further message processing. For example, it may be desirable to handle payment transactions. To do this, it maybe necessary to handle https, SSL, TSL or other secure protocols. This configuration would allow the extra decryption and encryption required to ensure that the messages to and from client 510 over network 520 are indeed secure. The data link 634 may be necessary to allow the two modules 530 and 632 to synchronize the messages, keys and the like. Of course, incoming client workload distributor module 530 and outgoing result distributor module 632 may be combined.

Additionally, this diagram illustrates other module groupings. For example, the incoming client workload distributor module 530, the outgoing result distributor module 632, the virtual incoming client request server(s) module 540 and the virtual outgoing client result server(s) module 590 are shown grouped as a common front end 631 module. Many of the groupings may be a function of computer power. As computers increase in computing power, it may be feasible to combine many of these functions into a common box. The opposite is also true. Requirements for additional speed or complex processing may make it advantageous to brake the modules into independent units.

Also illustrated in this embodiment is a cluster of SCIT controllers 680. These SCIT controllers 680 may operate asynchronous to each other. As shown, SCIT controller 682 controls virtual incoming client request server(s) module 540, SCIT controller 684 controls virtual application server(s) module 560, and SCIT controller 686 controls virtual outgoing client result server(s) module 590.

Figure 7:
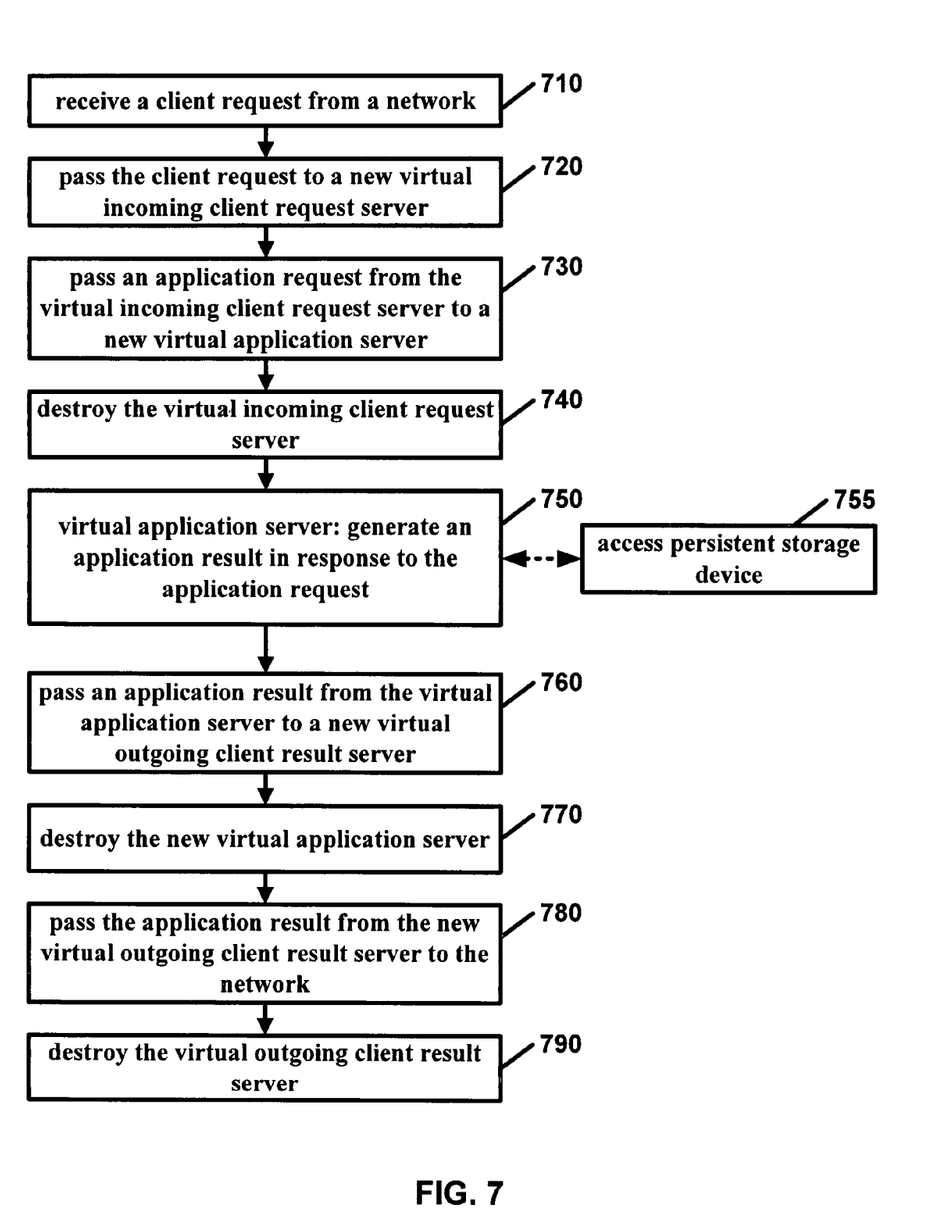
FIG. 7 is a flow diagram of a single use server as per an aspect of an alternative embodiment of the present invention.

Another type of variation illustrated in FIG. 6 is the message paths. FIGURE shows the incoming message changing from 10 to 12 as it passes through the incoming client workload distributor. This change in identification may signify that the message itself has been modified or changed. In this case, the message may have been decoded as part of a secure transaction. Similarly, return message 30 changes to return message 40 as it passes though outgoing result distributor 632. Again, this change may signify that a change has occurred such as encoding the message for a secure return to the client 510. Other differences include the virtual application server to which message 20 is forwarded. The virtual application server, whether it be virtual application server 562 or 566 is the result of specific design decision(s). These varia- FIG. 7 is a flow diagram of a single use server as per an aspect of an embodiment of the present invention. A client request may be received from a network at 710. The client request may have an IP address that matches the IP address of an incoming client workload distributor. The incoming client workload distributor may perform front end processing such as decoding secure messages (e.g. https or SSL messages). At this point, incoming client workload distributor may pass the client request to a new virtual incoming client request server at 720. The new virtual incoming client request server may be one a multitude of virtual client request servers that were preferably built prior to the receipt of the client request message. Each of the multitude of virtual client request servers preferably has an independent local IP address.

At 730, the client request message may be passed from the new virtual incoming client request server to a new virtual application server. This action may involve passing the message through an incoming application workload distributor that should direct the message to an available new virtual application server that is appropriately configured for acting on the client request message. The new virtual application server may be one a multitude of virtual application servers that were preferably built prior to the receipt of the client request message.

Once the client request message is received by a virtual application server, the virtual incoming client request server may be destroyed (at 740) and the virtual application server may generate an application result (at 750). The creation, management and destruction of the virtual incoming client request servers may be managed by a SCIT controller. In generating the application result, the virtual application server may need to access a persistent storage device.

The virtual application server may process the client (application) request. Depending on the application that needs to run, the virtual application server may need to interact with persistent backend storage. For example, the application may require interacting with a transaction processing system that includes entering and retrieving data from a database. The applications may include performing lengthy calculations. In these cases, the persistent storage may be used to store state variables that future requests to retrieve results and/or continue processing may be granted from new virtual application servers in the future. It should be noted that in some cases, future requests could come from additional functionality that schedules responses to provide continuity in processing when the process may need to outlive the life of a specific virtual server.

The application result may be passed from the virtual application server to a new virtual outgoing client result server at 760. An outgoing workload distributor may be used to ensure that the application result is sent to an available and appropriate virtual outgoing client result server. It may be advantageous for the virtual outgoing client result server to have been created prior to receiving application result. At this point, the new virtual application server may be destroyed at 770. The creation, management and destruction of the virtual application servers may be managed by a SCIT controller.

At 780, the application result may be passed from the new virtual outgoing client result server to the client through a network. An outgoing result distributor may be used to perform any required message protocol processes including attaching the proper IP address of the client to the message. Additionally, if the transaction is secure, the outgoing result distributor may need to encrypt at least part of the application result. The virtual outgoing client result server may be destroyed at 790. Like the other virtual servers, the creation, management and destruction of the virtual outgoing client result servers may be managed by a SCIT controller. The SCIT controllers for the different virtual servers may be independent or combines operating synchronously or asynchronously.

The actions just described may be performed by multiple tasks on one or more hardware systems. Each of the functions including but not limited to the server functions, workload distributors, SCIT controllers, associated interfaces and the like may be embodied as a series of discrete or combined modules. These modules (or groups thereof) may reside on one or more computers. For example, it is possible in one embodiment for a single hardware server to host a combination of virtual incoming client request servers, virtual application servers, and virtual outgoing client result servers. In another embodiment, the virtual incoming client request servers, virtual application servers, and virtual outgoing client result servers may all be on separate hardware servers.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on several specific the example(s) of virtual server randomization techniques such as configuring different virtual servers with different operating systems. However, one skilled in the art will recognize that embodiments of the invention could be used that provide many other randomization techniques such as for using images that not only of objects, but of abstract concepts such as flying or walking.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A single use server system comprising:

a) a connection to a network for receiving a client request;

b) an incoming client workload distributor configured to pass a client request from a network to a new virtual incoming client request server;

c) an incoming application workload distributor configured to pass an application request from the virtual incoming client request server to a new virtual application server;

d) persistent backend storage communicatively connected to the virtual application server;

e) an outgoing workload distributor configured to pass an application result from the virtual application server to a new virtual outgoing client request server; and f) an outgoing client request workload distributor configured to pass the application result from the new virtual outgoing client result server to the network;

g) wherein the virtual incoming client request server is created on a hardware server, the hardware server being controlled by unidirectional incoming hardware SCIT controller; and wherein:

i) the virtual incoming client request server is destroyed after delivering the application request;

ii) the virtual application server is destroyed after delivering the client result;

iii) the virtual outgoing client result server is destroyed after delivering the client result; and iv) the application request includes client information.

2. The single use server system according to claim 1, wherein the virtual incoming client request server and the virtual outgoing client result server reside on the same hardware server.

3. The single use server system according to claim 1, wherein the virtual incoming client request server, the virtual application server, and the virtual outgoing client result server reside on the same hardware server.

4. The single use server system according to claim 1, wherein the virtual incoming client request server and the virtual outgoing client result server reside on different hardware servers.

5. The single use server system according to claim 1, wherein the virtual incoming client request server, the virtual application server, and the virtual outgoing client result server reside on different hardware servers.

6. The single use server system according to claim 1, wherein the destruction of the virtual incoming client request server is controlled by a SCIT controller.

7. The single use server system according to claim 1, wherein the hardware server hosts the creation and destruction of a multitude of virtual incoming client request servers.

8. The single use server system according to claim 1, wherein a bank of hardware servers is controlled by the SCIT controller.

9. A method for processing a client request using virtual servers, the method comprising:

a) receiving the client request from a network;

b) passing the client request to a new virtual incoming client request server;

c) passing an application request from the virtual incoming client request server to a new virtual application server;

d) destroying the virtual incoming client request server;

e) passing an application result from the virtual application server to a new virtual outgoing client result server;

f) destroying the new virtual application server;

g) passing the application result from the new virtual outgoing client result server to the network;

h) destroying the virtual outgoing client result server; and g) the virtual incoming client request server is created on a hardware server, the hardware server being controlled by a unidirectional incoming hardware SCIT controller.

10. The method according to claim 9, further including the virtual application server interacting with a persistent backend storage.

11. The method according to claim 9, wherein the destruction of the virtual incoming client request server is initiated by a SCIT controller.

12. The method according to claim 9, wherein the destruction of the virtual application server is initiated by a SCIT controller.

13. The method according to claim 9, wherein the destruction of the virtual outgoing client result server is initiated by a SCIT controller.

14. The method according to claim 9, wherein the virtual incoming client request server and the virtual outgoing client result server reside on the same hardware server.

15. The method according to claim 9, wherein the virtual incoming client request server, the virtual application server, and the virtual outgoing client result server reside on the same hardware server.

16. The method according to claim 9, wherein the virtual incoming client request server and the virtual outgoing client result server reside on different hardware servers.

17. The method according to claim 9, wherein the virtual incoming client request server, the virtual application server, and the virtual outgoing client result server reside on different hardware servers.

18. The method according to claim 9, wherein a hardware server hosts the creation and destruction of a multitude of virtual incoming client request servers.

19. The method according to claim 9, wherein a hardware server hosts the creation and destruction of a multitude of virtual application servers.

20. The method according to claim 9, wherein a hardware server hosts the creation and destruction of a multitude of virtual outgoing client result servers.

21. The method according to claim 9, wherein a hardware server hosts a combination of at least two of the following:

a) virtual incoming client request servers, b) virtual application servers; and c) virtual outgoing client result servers.

* * * * *